(12) United States Patent
Miyazawa et al.

(10) Patent No.: US 12,530,547 B2
(45) Date of Patent: Jan. 20, 2026

(54) CARD INSERTION PART AND CARD READER

(71) Applicant: NIDEC INSTRUMENTS CORPORATION, Nagano (JP)

(72) Inventors: Shinya Miyazawa, Nagano (JP); Keiji Ohta, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 0 days.

(21) Appl. No.: 19/077,061

(22) Filed: Mar. 12, 2025

(65) Prior Publication Data

US 2025/0292037 A1    Sep. 18, 2025

(30) Foreign Application Priority Data

Mar. 13, 2024   (JP) .................. 2024-038593

(51) Int. Cl.
   *G06K 7/00* (2006.01)
   *G06K 7/08* (2006.01)
   *G06K 7/10* (2006.01)

(52) U.S. Cl.
   CPC ........... *G06K 7/0008* (2013.01); *G06K 7/087* (2013.01); *G06K 7/10009* (2013.01)

(58) Field of Classification Search
   CPC .... G06K 7/0008; G06K 7/087; G06K 7/10009
   USPC ........................................................ 235/449
   See application file for complete search history.

(56) References Cited

U.S. PATENT DOCUMENTS 9,740,890 B2    8/2017   Watanabe et al.

*Primary Examiner* — Allyson N Trail
(74) *Attorney, Agent, or Firm* — HAUPTMAN HAM, LLP

(57) ABSTRACT

A card insertion part for a card reader includes a flange part, two separated protruding parts and a light-emitting part disposed on the front side with respect to the flange part. The light-emitting part includes light sources and an optical member such as a diffusion member. The optical member is formed with a recessed part in which the light sources are disposed and is formed so as to surround the two protruding parts and a cut-out part between the two protruding parts together. A front surface and an inner peripheral surface of the optical member are shone by lights emitted from the light sources. The front surface of the optical member is disposed on the front side with respect to a rear surface of the cut-out part, and the inner peripheral surface of the optical member is exposed between the two protruding parts.

6 Claims, 5 Drawing Sheets

CARD INSERTION PART AND CARD READER

CROSS REFERENCE TO RELATED APPLICATION

The present invention claims priority under 35 U.S.C. § 119 to Japanese Application No. 2024-038593 filed Mar. 13, 2024, the entire content of which is incorporated herein by reference.

TECHNICAL FIELD

At least an embodiment of the present invention may relate to a card insertion part and a card reader.

BACKGROUND

Conventionally, a card insertion part for a card reader which is formed with a card insertion slot has been known (see, for example, Japanese Patent Laid-Open No. 2015-232822 (Patent Literature 1). The card insertion part described in Patent Literature 1 is formed with a cut-out part which is cut out from a front end of the card insertion part toward a rear side at an intermediate position in a left-right direction which is a width direction of a card. The card insertion slot is formed on both sides in the left-right direction and a rear side of the cut-out part. The card insertion part described in Patent Literature 1 includes a plurality of light sources and a light guiding member, two guide parts in which a part of the card passage is formed, and a cover member in a hollow shape in which the card insertion slot is formed.

In the card insertion part described in Patent Literature 1, the guide part is disposed on both sides of the cut-out part in the left-right direction. The guide part is disposed in an inside of the cover member formed in a hollow shape. Further, a plurality of the light sources and the light guiding member are also disposed in the inside of the cover member. The cover member is formed of translucent light transmissive material. Therefore, in the card insertion part described in Patent Literature 1, the entire peripheral portion of the card insertion slot can be uniformly, dimly and prettily lighted by lights emitted from the light sources.

The present inventors have been developing a card reader including a card insertion part, similarly to the card insertion part described in Patent Literature 1, in which a cut-out part that is cut out from its front end toward a rear side is formed at an intermediate position in a width direction of a card. The present inventors have examined that, in a card reader under development, the card insertion part is lighted to enhance decorativeness of the card insertion part. Like the card insertion part described in Patent Literature 1, when a plurality of the light sources and the light guiding member are disposed in an inside of the cover member and the cover member is formed of translucent light transmissive material, the card insertion part can be lighted. However, in this case, light sources and a light guiding member are further required to be disposed in an inside of the cover member where guide parts are disposed and thus, mechanical attaching work of the light sources and the light guiding member is complicated and, as a result, assembling work of the card insertion part may be complicated.

SUMMARY

In view of the problem described above, at least an embodiment of the present invention may advantageously provide a card insertion part formed with a cut-out part which is cut out from its front end toward a rear side at an intermediate position in a width direction of a card, and the card insertion part is capable of being easily assembled even when decorativeness can be enhanced. Further, at least an embodiment of the present invention may advantageously provide a card reader including the card insertion part.

According to at least an embodiment of the present invention, there may be provided a card insertion part for a card reader, the card insertion part being formed with a card insertion slot into which a card is inserted. When a side in an inserting direction of the card into the card insertion slot which is one side in a moving direction of the card that is moved in an inside of the card reader is referred to as a rear side, the other side to the side in the inserting direction of the card is referred to as a front side, and a direction perpendicular to a thickness direction of the card inserted into the card insertion slot and perpendicular to the moving direction of the card is referred to as a width direction of the card, the card insertion part includes a flange part whose thickness direction is the moving direction of the card, two protruding parts which are disposed in a separated state from each other in the width direction of the card and are protruded to the front side with respect to the flange part, and a light-emitting part which is disposed on the front side with respect to the flange part and is disposed on the rear side with respect to front surfaces of the protruding parts. A portion between the two protruding parts in the width direction of the card is a cut-out part which is cut out from a front end of the card insertion part toward the rear side, and the card insertion slot is formed on an inner side face of the protruding part in the width direction of the card, on a front surface of the protruding part and on a rear surface of the cut-out part, the light-emitting part includes a plurality of light sources and an optical member which is a diffusion member or a light guiding member, the optical member is formed with a light source arrangement recessed part in which a plurality of the light sources is disposed, and the optical member is formed in a frame shape so as to surround the two protruding parts and a rear side portion of the cut-out part together. At least a front surface and an inner peripheral surface of the optical member are shone by lights emitted from a plurality of the light sources, the front surface of the optical member is disposed on the front side with respect to the rear surface of the cut-out part, and a part of the inner peripheral surface of the optical member is exposed between the two protruding parts in the width direction of the card and on both sides in the thickness direction of the card.

The card insertion part in this embodiment includes a light-emitting part which is disposed on the front side with respect to the flange part, and the light-emitting part includes a plurality of light sources and an optical member which is a diffusion member or a light guiding member. Further, in this embodiment, at least a front surface and an inner peripheral surface of the optical member formed in a frame shape are shone by lights emitted from a plurality of the light sources. Therefore, according to this embodiment, the card insertion part is illuminated to enhance decorativeness of the card insertion part.

Further, in this embodiment, the optical member is formed with a light source arrangement recessed part in which a plurality of the light sources is disposed, and the optical member is formed in a frame shape so as to surround the two protruding parts and a rear side portion of the cut-out part together. Therefore, in this embodiment, when the two protruding parts are inserted from the rear side and are disposed on an inner peripheral side of the optical member formed in a frame shape whose light source arrangement recessed part is arranged with a plurality of the light sources, mechanical attaching work of the light-emitting part can be completed. Accordingly, in this embodiment, the card insertion part can be easily assembled. In other words, in this embodiment, even when decorativeness of the card insertion part can be enhanced, the card insertion part can be easily assembled.

Further, in this embodiment, the front surface of the optical member is disposed on the front side with respect to the rear surface of the cut-out part, and a part of the inner peripheral surface of the optical member is exposed on both sides in a thickness direction of a card between the two protruding parts in a width direction of the card. Therefore, according to this embodiment, the rear side of the cut-out part can be shone brightly by the inner peripheral surface of the optical member which is illuminated. Accordingly, in this embodiment, decorativeness of the card insertion part can be further enhanced.

The card insertion part in this embodiment may be used in a card reader including a card accommodating part which is disposed on the rear side with respect to the card insertion part and in which a rear side portion of a card inserted from the card insertion slot is accommodated. In the card reader, even when decorativeness of the card insertion part can be enhanced, the card insertion part can be easily assembled.

Effects of the Invention

As described above, in accordance with an embodiment of the invention, in a card insertion part formed with a cut-out part which is cut out from its front end toward a rear side at an intermediate position in a width direction of a card, even when decorativeness of the card insertion part can be enhanced, the card insertion part can be easily assembled.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of the present invention will be described below with reference to the following drawings.
(Entire Structure of Card Reader)

Figure 1:
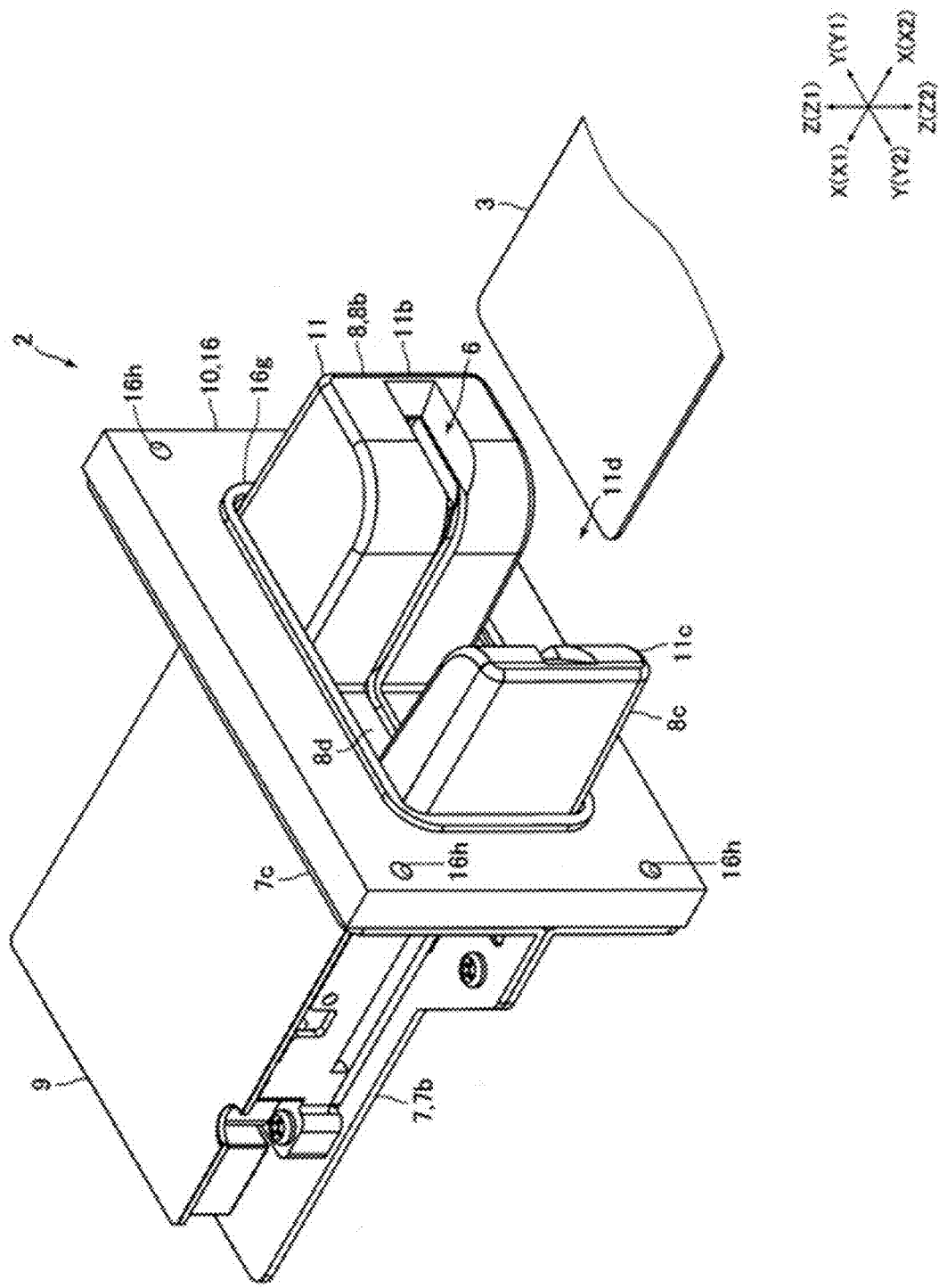
FIG. 1 is a perspective view showing a card reader in accordance with an embodiment of the present invention.
Figure 2:
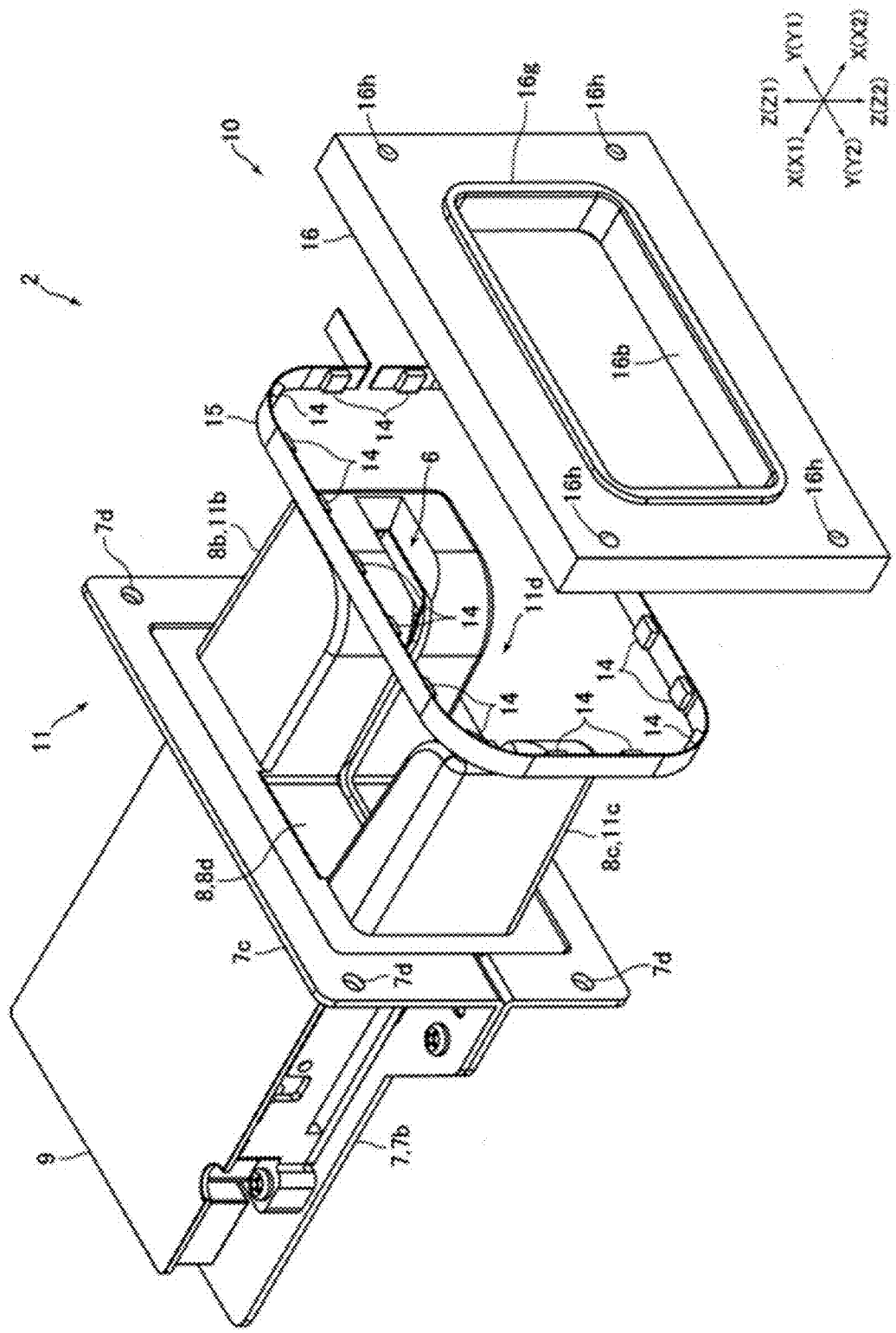
FIG. 2 is an exploded perspective view showing the card reader in FIG. 1.
Figure 3:
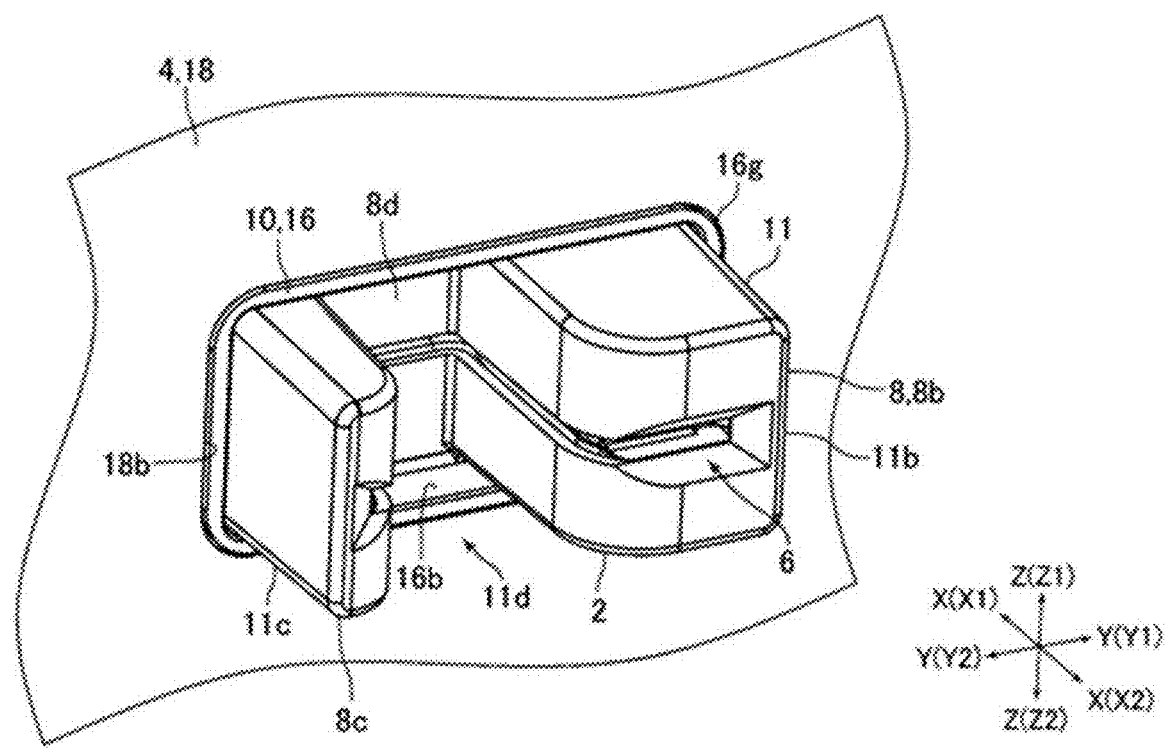
FIG. 3 is a perspective view showing a portion on a front face side of a host apparatus to which the card reader shown in FIG. 1 is attached.
Figure 4:
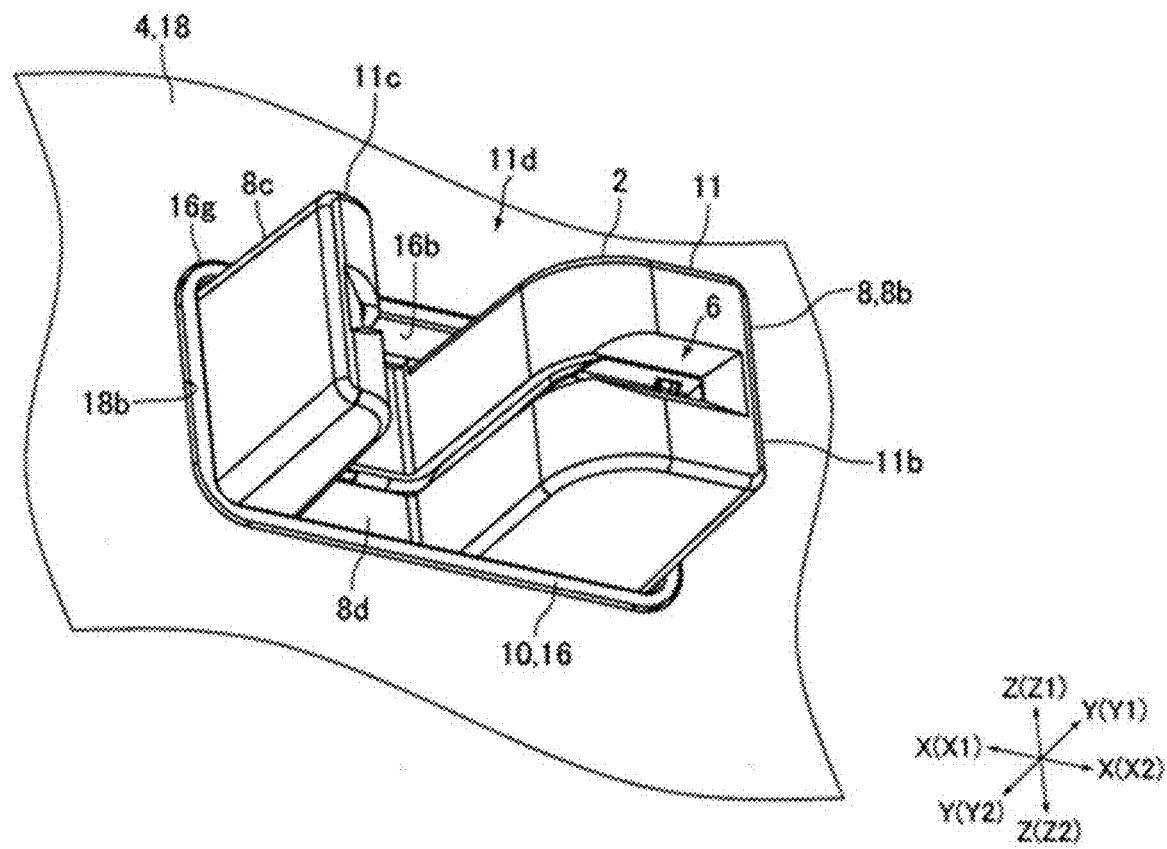
FIG. 4 is another perspective view showing a portion on the front face side of the host apparatus to which the card reader shown in FIG. 1 is attached.

FIG. 1 is a perspective view showing a card reader 2 in accordance with an embodiment of the present invention. FIG. 2 is an exploded perspective view showing the card reader 2 in FIG. 1. FIGS. 3 and 4 are perspective views showing a portion on a front face side of a host apparatus to which the card reader 2 shown in FIG. 1 is attached.

A card reader 2 in this embodiment is a device which performs reading of data recorded in a card 3 and recording data to the card 3. Specifically, the card reader 2 is a manual type card reader in which insertion of a card 3 to the card reader 2 and pulling-out of the card 3 from the card reader 2 are manually performed. In other words, the card reader 2 is a so-called dip-type card reader. The card reader 2 is, for example, equipped and used in a predetermined host apparatus 4 such as a game machine which is installed in a casino, a game center, and the like.

A card 3 is, for example, a rectangular card made of vinyl chloride whose thickness is about 0.7-0.8 mm. The card 3 is formed with a magnetic stripe in which magnetic data are recorded. Further, the card 3 has a built-in IC chip. The card 3 is formed with an external connection terminal of the IC chip. In accordance with an embodiment of the present invention, a communication antenna may be built in the card 3 for performing communication with an IC chip of a card 3 in a contactless manner. Further, the card 3 may be a PET (polyethylene terephthalate) card whose thickness is about 0.18-0.36 mm, or a paper card having a predetermined thickness and the like.

The card reader 2 is formed with a card insertion slot 6 into which a card 3 is inserted. A card moving passage where a card 3 inserted from the card insertion slot 6 is moved is formed in an inside of the card reader 2. The card reader 2 includes a main body frame 7 in which the card moving passage is formed and a front face cover (front bezel) 8 in which the card insertion slot 6 is formed. Further, the card reader 2 includes a magnetic head for performing reading of magnetic data recorded in a card 3 and the like and an IC contact block having a plurality of IC contact springs which are capable of contacting an external connection terminal of the card 3.

In this embodiment, a card 3 which is operated manually is moved in the X-direction in FIG. 1 and the like. In other words, the X-direction is a moving direction of a card 3 which is moved in an inside of the card reader 2 (specifically, a moving direction of a card 3 which is moved along the card moving passage). Further, the card 3 is inserted into the card insertion slot 6 toward the X1-direction side that is one side in the X-direction and is pulled out from the card insertion slot 6 toward the X2-direction side that is the other side in the X-direction. Further, the Z-direction perpendicular to the X-direction in FIG. 1 and the like is a thickness direction of the card 3 which is inserted into the card insertion slot 6 and is moved along the card moving passage, and the Y-direction perpendicular to the X-direction and the Z-direction in FIG. 1 and the like is a width direction (short width direction) of the card 3 which is inserted into the card insertion slot 6 and is moved along the card moving passage.

In the following descriptions, the X-direction which is a moving direction of the card 3 is defined as a front-rear direction. Further, the Y-direction is defined as a left-right direction, and the Z-direction is defined as an upper-lower direction. Further, the X1-direction side which is an inserting direction side of the card 3 to the card insertion slot 6 is referred to as a "rear" side or a "back" side, and the X2-direction side which is a pulling-out direction side of the card 3 from the card reader 2 (in other words, the other side to the inserting direction side of the card 3) is referred to as a "front" side. Further, the Y1-direction side in FIG. 1 and the like which is one side in the left-right direction is referred to as a "right" side, the Y2-direction side in FIG. 1 and the like which is the other side in the left-right direction is referred to as a "left" side, the Z1-direction side in FIG. 1 and the like which is one side in the upper-lower direction is referred to as an "upper" side, and the Z2-direction side in FIG. 1 and the like which is the other side in the upper-lower direction is referred to as a "lower" side.

The main body frame 7 is provided with a card accommodating part 7b in which a rear side portion of a card 3 inserted from the card insertion slot 6 is accommodated, and a flange part 7c for fixing the card reader 2 to a host apparatus 4. The card accommodating part 7b structures a rear side portion of the main body frame 7. The IC contact block is attached to the card accommodating part 7b. The flange part 7c is enlarged in a flange shape from a front end of the card accommodating part 7b in a direction perpendicular to the front-rear direction. The flange part 7c is formed in a flat plate shape whose thickness direction is the front-rear direction.

Further, the flange part 7c is formed in a rectangular frame shape. Each of four corners of the flange part 7c is formed with a through hole 7d penetrating through in the front-rear direction. A circuit board 9 which is a rigid board such as a glass epoxy substrate is fixed to an upper face side of the card accommodating part 7b. The circuit board 9 is disposed on the rear side with respect to the flange part 7c.

Further, the main body frame 7 is provided with a head arrangement part where a magnetic head is disposed and a card guide part for guiding a card 3. The head arrangement part and the card guide part are protruded to the front side from the card accommodating part 7b. The head arrangement part and the card guide part are disposed in a separated state from each other in the left-right direction. In this embodiment, the head arrangement part is disposed on the right side, and the card guide part is disposed on the left side. The card moving passage is formed in the card accommodating part 7b, the head arrangement part and the card guide part.

A front face cover 8 structures a front face part of the card reader 2. Further, the front face cover 8 is disposed on the front face side of the main body frame 7 and covers a front end side portion of the main body frame 7. The front face cover 8 is provided with a first cover part 8b which covers the head arrangement part of the main body frame 7 and a second cover part 8c which covers the card guide part of the main body frame 7. The first cover part 8b and the second cover part 8c are disposed in a separated state from each other in the left-right direction. Further, the front face cover 8 is provided with a connection part 8d in a flat plate shape which connects a rear end of the first cover part 8b with a rear end of the second cover part 8c. The connection part 8d is formed in a flat plate shape whose thickness direction is the front-rear direction.

The first cover part 8b and the second cover part 8c are formed in a hollow shape. The first cover part 8b covers the head arrangement part of the main body frame 7 from both sides in the left-right direction, both sides in the upper-lower direction and the front side. The second cover part 8c covers the card guide part of the main body frame 7 from both sides in the left-right direction, both sides in the upper-lower direction and the front side. A rear face of the front face cover 8 is opened, and the head arrangement part and the card guide part of the main body frame 7 are inserted into the first cover part 8b and the second cover part 8c from the rear side.

Further, the card reader 2 includes a light-emitting part 10 which is disposed on the front side with respect to the flange part 7c. In this embodiment, the card insertion part 11 for a card reader which is formed with the card insertion slot 6 is structured of a portion of the main body frame 7 including the flange part 7c, the head arrangement part and the card guide part which are disposed on the front side with respect to the card accommodating part 7b, and the front face cover 8 and the light-emitting part 10. The card insertion part 11 is disposed on the front side with respect to the card accommodating part 7b. In other words, the card accommodating part 7b is disposed on the rear side with respect to the card insertion part 11. Next, a specific structure of the card insertion part 11 will be described below.

(Structure of Card Insertion Part)

Figure 5:
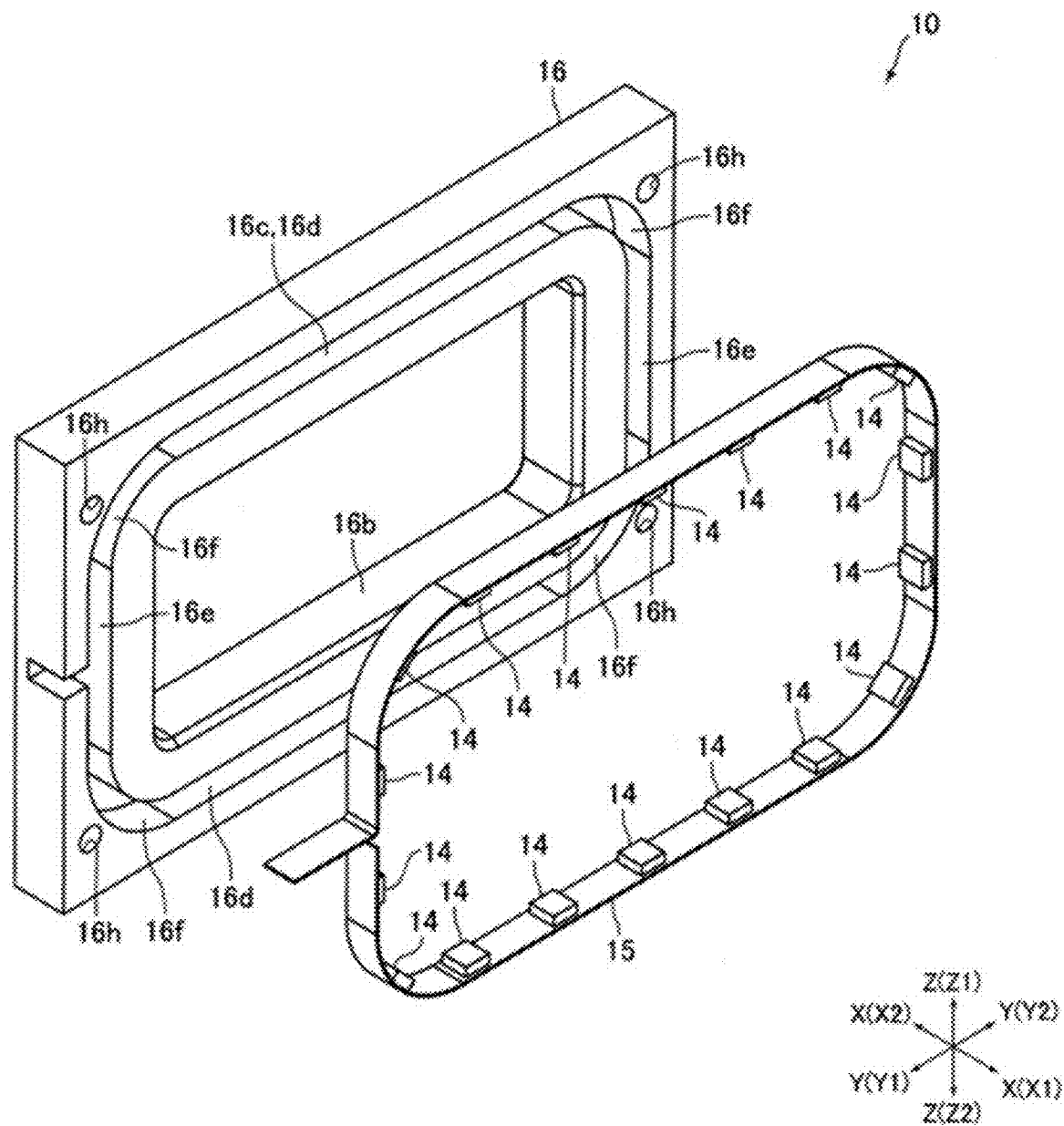
FIG. 5 is a perspective view showing light sources, a board and a diffusion member shown in FIG. 2 which are viewed from a rear side.

FIG. 5 is a perspective view showing light sources 14, a board 15 and a diffusion member 16 shown in FIG. 2 which are viewed from the rear side.

As described above, the main body frame 7 is provided with the flange part 7c which is enlarged in a flange shape from the front end of the card accommodating part 7b, and the head arrangement part and the card guide part which are protruded from the card accommodating part 7b to the front side. The head arrangement part and the card guide part are disposed in a state separated from each other in the left-right direction. Further, the front face cover 8 is provided with the first cover part 8b, which covers the head arrangement part of the main body frame 7, and the second cover part 8c which covers the card guide part of the main body frame 7. The first cover part 8b and the second cover part 8c are disposed in a state separated from each other in the left-right direction.

In this embodiment, a protruding part 11b which is protruded to the front side with respect to the flange part 7c is structured of the head arrangement part and the first cover part 8b, and a protruding part 11c which is protruded to the front side with respect to than flange part 7c is structured of the card guide part and the second cover part 8c. The protruding part 11b and the protruding part 11c are disposed in a state separated from each other in the left-right direction. In other words, the card insertion part 11 is provided with two protruding parts 11b and 11c which are disposed in a separated state from each other in the left-right direction and are protruded to the front side with respect to the flange part 7c.

The protruding parts 11b and 11c are respectively disposed on both end sides of the card insertion part 11 in the left-right direction. Rear ends of the protruding parts 11b and 11c are disposed on the rear side with respect to a front surface of the flange part 7c. Specifically, the rear ends of the protruding parts 11b and 11c are disposed on a slightly rear side with respect to the front surface of the flange part 7c. In accordance with an embodiment of the present invention, the rear ends of the protruding parts 11b and 11c may be disposed on the front side with respect to the front surface of the flange part 7c, or the rear ends of the protruding parts 11b and 11c and the front surface of the flange part 7c may be disposed at the same position in the front-rear direction.

A portion between the protruding part 11b and the protruding part 11c in the left-right direction is a cut-out part 11d which is cut out from a front end of the card insertion part 11 toward the rear side. In other words, at an intermediate position of the card insertion part 11 in the left-right direction, the cut-out part 11d is formed which is cut out from the front end of the card insertion part 11 toward the rear side. A shape of the cut-out part 11d when viewed in the upper-lower direction is a substantially rectangular shape or a substantially U-shape whose front end side is opened. A width in the left-right direction of the cut-out part 11d is set to be a size where fingers of a user of the card reader 2 can be inserted.

In a state that a card 3 is inserted into the rear end side of the card reader 2, a part of the card 3 is exposed in the cut-out part 11d. The cut-out part 11d is provided in order that a user holds the card 3 when the card 3 is inserted to the card reader 2 and the card 3 is pulled out from the card reader 2. In other words, a space formed by the cut-out part 11d serves as a holding margin (gripping margin) for a user to hold the card 3 when the card 3 is inserted into the card reader 2 and the card 3 is pulled out from the and card reader 2. A user of the card reader 2 inserts his/her fingers to the holding margin and holds the card 3 to perform insertion and pulling-out of the card 3.

The card insertion slot 6 is formed on a front surface and a left side face of the protruding part 11b, a front surface and a right side face of the protruding part 11c, and a rear face (connection part 8d) of the cut-out part 11d. In other words, the card insertion slot 6 is formed on the inner side faces in the left-right direction of the protruding parts 11b and 11c, the front surfaces of the protruding parts 11b and 11c, and the rear face of the cut-out part 11d. Specifically, the card insertion slot 6 is formed on the front surface and the left side face of the first cover part 8b, the front surface and the right side face of the second cover part 8c, and the connection part 8d.

The light-emitting part 10 is disposed on the rear side with respect to the front surfaces of the protruding parts 11b and 11c. The light-emitting part 10 includes a plurality of light sources 14, a board 15 on which a plurality of the light sources 14 is mounted, and a diffusion member (light diffusion member) 16 as an optical member which has a diffusion function of light (function to irregularly reflect light). The light-emitting part 10 in this embodiment is structured of a plurality of the light sources 14, the board 15 and the diffusion member 16. The light source 14 is an LED (Light Emitting Diode). The board 15 is a flexible printed circuit board. The board 15 is formed in a long and thin belt shape. A plurality of the light sources 14 is mounted on one of faces of the board 15 with constant intervals. In this embodiment, 18 light sources 14 are mounted on the board 15.

The diffusion member 16 contains light diffusion material such as glass beads. The diffusion member 16 is formed in a frame shape. Further, the diffusion member 16 is formed in a flat plate shape whose thickness direction is the front-rear direction. A thickness of the diffusion member 16 is larger than a thickness of the flange part 7c. A rear face of the diffusion member 16 contacts the front surface of the flange part 7c. The diffusion member 16 is disposed so as to surround rear side portions of the two protruding parts 11b and 11c and the cut-out part 11d together. In other words, the diffusion member 16 is formed in a frame shape so as to surround the rear side portions of the two protruding parts 11b and 11c and the cut-out part 11d together. The diffusion member 16 in this embodiment is formed in a rectangular frame shape and is structured of two long side parts and two short side parts. The outward shape of the diffusion member 16 is substantially equal to an outward shape of the flange part 7c The two long side parts of the diffusion member 16 are disposed on both sides in the upper-lower direction of the rear side portions of the protruding parts 11b and 11c and the cut-out part 11d. One of the short side parts of the diffusion member 16 is disposed on the right side with respect to the protruding part 11b. The other of the short side parts of the diffusion member 16 is disposed on the left side with respect to the protruding part 11c. An inner peripheral surface of the diffusion member 16 is structured of two flat surfaces 16b which are perpendicular to the upper-lower direction, two flat surfaces which are perpendicular to the left-right direction, and curved surfaces smoothly connecting the flat surfaces perpendicular to the left-right direction with the flat surfaces 16b. An outer peripheral surface of the diffusion member 16 is structured of two flat surfaces which are perpendicular to the upper-lower direction, and two flat surfaces which are perpendicular to the left-right direction.

As described above, the light-emitting part 10 is disposed on the rear side with respect to the front surfaces of the protruding parts 11b and 11c, and the diffusion member 16 is disposed on the rear side with respect to the front surfaces of the protruding parts 11b and 11c. Further, the rear face of the diffusion member 16 contacts the front surface of the flange part 7c. The front surface of the diffusion member 16 is disposed on the front side with respect to the rear face (connection part 8d) of the cut-out part 11d. In other words, the front surface of the diffusion member 16 is disposed on the front side with respect to a front surface of the connection part 8d of the front face cover 8. A part of the inner peripheral surface of the diffusion member 16 is exposed on both sides in the upper-lower direction between the two protruding parts 11b and 11c in the left-right direction. Specifically, parts of the two flat surfaces 16b which structure a part of the inner peripheral surface of the diffusion member 16 are exposed on both sides in the upper-lower direction between the two protruding parts 11b and 11c in the left-right direction.

The diffusion member 16 is formed with a light source arrangement recessed part 16c where a plurality of the light sources 14 and the board 15 are disposed (see FIG. 5). The light source arrangement recessed part 16c is recessed from the rear face of the diffusion member 16 toward the front side. Further, the light source arrangement recessed part 16c is formed in a ring shape so as to surround the inner peripheral surface of the diffusion member 16. Specifically, the light source arrangement recessed part 16c is formed in a rectangular ring shape. The light source arrangement recessed part 16c is formed at an intermediate position in a radial direction of the diffusion member 16. In this embodiment, each of four corners of the light source arrangement recessed part 16c which is formed in a rectangular ring shape is formed in a curved shape.

The board 15 is disposed in an inside of the light source arrangement recessed part 16c in a state that the board 15 is formed in a rectangular shape. Specifically, the board 15 is disposed in the inside of the light source arrangement recessed part 16c so that one of faces of the board 15 on which a plurality of the light sources 14 is mounted faces an inner peripheral side of the diffusion member 16. A plurality of the light sources 14 is arranged in a circumferential direction of the light source arrangement recessed part 16c in a state that a light emitting side of the light source 14 faces the inner peripheral side of the diffusion member 16 (in other words, in a state that a light emitting surface of an LED faces the inner peripheral side of the diffusion member 16). In this case, in order to prevent the board 15 from falling off from the light source arrangement recessed part 16c, a tape may be stuck on the rear face of the diffusion member 16.

The light source 14 is disposed in each of the long side part 16d, the short side part 16e and a corner part 16f of the light source arrangement recessed part 16c which is formed in a rectangular ring shape. For example, five light sources 14 are arranged in the long side part 16d, two light sources 14 are arranged in the short side part 16e, and one light source 14 is arranged in the corner part 16f. At least the front surface and the inner peripheral surface of the diffusion member 16 are shone by the lights emitted from a plurality of the light sources 14. In this embodiment, the front surface, the rear surface and the inner peripheral surface of the diffusion member 16 are shone by the lights emitted from a plurality of the light sources 14.

The front surface of the diffusion member 16 is formed with an annular projecting part 16g in a ring shape which is protruded toward the front side. The annular projecting part 16g slightly projects from the front surface of the diffusion member 16 toward the front side. The annular projecting part 16g is formed along the inner peripheral surface of the diffusion member 16 and is formed in a rectangular ring shape. The inner peripheral surface of the annular projecting part 16g structures a part of the inner peripheral surface of the diffusion member 16. The annular projecting part 16g is arranged on the inner peripheral side of the diffusion member 16 with respect to the light source arrangement recessed part 16c. In other words, the light source arrangement recessed part 16c is arranged on the outer peripheral side of the diffusion member 16 with respect to the annular projecting part 16g.

Each corner part of four corners of the diffusion member 16 is formed with a through hole 16h which is penetrated through in the front-rear direction. Further, as described above, each corner part of four corners of the flange part 7c is formed with the through hole 7d. When viewed in the front-rear direction, the through hole 7d and the through hole 16h are overlapped with each other. The through hole 7d and the through hole 16h are through holes for a screw which is used for fixing the card reader 2 to a host apparatus 4. The flange part 7c and the diffusion member 16 are fastened together by a screw arranged in the through holes 7d and 16h and are fixed to the host apparatus 4.

In this embodiment, the card reader 2 is attached to the host apparatus 4 so that a rear face of the front face panel 18 structuring the front surface of the host apparatus 4 and the front surface of the diffusion member 16 contact each other. The Z-direction of the card reader 2 attached to the host apparatus 4 is coincided with the vertical direction. However, it may be structured that the Z-direction of the card reader 2 attached to the host apparatus 4 does not coincide with the vertical direction. For example, the Z-direction of the card reader 2 attached to the host apparatus 4 may coincide with the horizontal direction. The front face panel 18 is formed with an opening 18b in a rectangular shape into which the annular projecting part 16g is fitted (see FIGS. 3 and 4). In a state that the card reader 2 is attached to the host apparatus 4, the annular projecting part 16g, the protruding parts 11b and 11c and the cut-out part 11d are arranged in an inside of the opening 18b.

In a state that the card reader 2 is attached to the host apparatus 4, the annular projecting part 16g can be seen from the front side with respect to the host apparatus 4. However, a portion of the front surface of the diffusion member 16 except the annular projecting part 16g is arranged on the rear side with respect to the front face panel 18 and cannot be seen from the front side with respect to the host apparatus 4. Further, in a state that the card reader 2 is attached to the host apparatus 4, parts of two flat surfaces 16b which are exposed on both sides in the upper-lower direction between the two protruding parts 11b and 11c are seen from the front side with respect to the host apparatus 4. Specifically, a part of the flat surface 16b disposed on the lower side is seen from an obliquely upper front side with respect to the host apparatus 4 (see FIG. 3), and a part of the flat surface 16b disposed on the upper side is seen from an obliquely lower front side with respect to the host apparatus 4 (see FIG. 4).

Principal Effects in This Embodiment

As described above, in this embodiment, the card insertion part 11 includes the light-emitting part 10 disposed on the front side with respect to the flange part 7c, and the light-emitting part 10 includes a plurality of the light sources 14 and the diffusion member 16. Further, in this embodiment, at least the front surface and the inner peripheral surface of the diffusion member 16 formed in a frame shape are shone by the lights emitted from a plurality of the light sources 14. Therefore, in this embodiment, the card insertion part 11 is illuminated to enhance decorativeness of the card insertion part 11.

Especially, in this embodiment, the front surface of the diffusion member 16 is disposed on the front side with respect to the rear surface of the cut-out part 11d, and parts of the two flat surfaces 16b which structure a part of the inner peripheral surface of the diffusion member 16 are exposed on both sides in the upper-lower direction between the two protruding parts 11b and 11c in the left-right direction. Therefore, in this embodiment, the rear side of the cut-out part 11d can be shone brightly by the flat surfaces 16b of the diffusion member 16 which are shone. Accordingly, in this embodiment, decorativeness of the card insertion part 11 can be further enhanced. Further, in this embodiment, the rear side of the cut-out part 11d in which the card insertion slot 6 is formed can be shone brightly and thus, a user of the card reader 2 is capable of easily performing an inserting operation and a pulling-out operation of a card 3 to the card insertion part 11.

Further, in this embodiment, even in a state that the card reader 2 is attached to the host apparatus 4, parts of the two flat surfaces 16b, which are exposed on both sides in the upper-lower direction between the two protruding parts 11b and 11c, and the annular projecting part 16g are seen from the front side with respect to the host apparatus 4. Therefore, even in a state that the card reader 2 is attached to the host apparatus 4, decorativeness of the card insertion part 11 can be further enhanced.

In this embodiment, the diffusion member 16 is formed with the light source arrangement recessed part 16c where a plurality of the light sources 14 and the board 15 are disposed. Further, in this embodiment, the diffusion member 16 is formed in a frame shape so as to surround the rear side portions of the two protruding parts 11b and 11c and the cut-out part 11d together. Therefore, in this embodiment, when the two protruding parts 11b and 11c are inserted from the rear side and are disposed on an inner peripheral side of the diffusion member 16 in a frame shape whose light source arrangement recessed part 16c is arranged with a plurality of the light sources 14 and the board 15, mechanical attaching work of the light-emitting part 10 can be completed. Accordingly, in this embodiment, the card insertion part 11 can be easily assembled. In other words, according to this embodiment, even when decorativeness of the card insertion part 11 can be enhanced, the card insertion part 11 can be easily assembled.

In this embodiment, a plurality of the light sources 14 is arranged in a circumferential direction of the light source arrangement recessed part 16c in a state that a light emitting side of the light source 14 faces the inner peripheral side of the diffusion member 16. Therefore, in this embodiment, the inner peripheral surface of the diffusion member 16 can be shone further brightly and, as a result, the rear side of the cut-out part 11*d* can be shone further brightly. Further, in this embodiment, the light source 14 is also disposed in the corner parts 16*f* in addition to the long side parts 16*d* and the short side parts 16*e* of the light source arrangement recessed part 16*c* formed in a rectangular ring shape. Therefore, according to this embodiment, unevenness of brightness of the diffusion member 16 in a circumferential direction of the diffusion member 16 can be suppressed.

In this embodiment, the light source arrangement recessed part 16*c* is disposed on the outer peripheral side of the diffusion member 16 with respect to the annular projecting part 16*g* and thus, a distance between the light sources 14 disposed in the light source arrangement recessed part 16*c* and the cut-out part 11*d* disposed on the inner peripheral side with respect to the diffusion member 16 can be increased. Therefore, in this embodiment, when a card 3 is inserted into the card insertion part 11, or when the card 3 is pulled out from the card insertion part 11, even when static electricity is generated between a user who operates the card 3 and the card insertion part 11, the light sources 14 disposed in the light source arrangement recessed part 16*c* are less affected by the static electricity.

In this embodiment, the flange part 7*c* and the diffusion member 16 are fastened and fixed together to the host apparatus 4. Therefore, in this embodiment, the diffusion member 16 is not required to be fixed to the flange part 7*c*. Accordingly, in this embodiment, a structure of the card insertion part 11 can be simplified. Further, in this embodiment, the diffusion member 16 is disposed on an outer side with respect to the front face cover 8 and thus, in comparison with a case that the diffusion member 16 is disposed in an inside of the front face cover 8, an inside structure of the front face cover 8 can be simplified.

Other Embodiments

Although the present invention has been shown and described with reference to a specific embodiment, various changes and modifications will be apparent to those skilled in the art from the teachings herein.

In the embodiment described above, no light source 14 may be disposed in the corner part 16*f* of the light source arrangement recessed part 16*c*. Further, in the embodiment described above, the diffusion member 16 may be formed in a frame shape other than a rectangle. For example, the diffusion member 16 may be formed in an elliptical frame shape. In this case, the light source arrangement recessed part 16*c* may be formed in an elliptical ring shape. Further, in the embodiment described above, the light source arrangement recessed part 16*c* is not required to be formed in a ring shape.

In the embodiment described above, the opening part 18*b* may be formed in the front face panel 18 so that a portion of the front surface of the diffusion member 16 other than the annular projecting part 16*g* can be seen from the front side with respect to the host apparatus 4. In this case, no annular projecting part 16*g* may be formed on the front surface of the diffusion member 16. Further, in the embodiment described above, the light-emitting part 10 may be fixed to the flange part 7*c*. In addition, in the embodiment described above, the light-emitting part 10 may include a light guiding member as an optical member instead of the diffusion member 16. In this case, the light guiding member is formed in the same shape as the diffusion member 16. Further, in this case, a plurality of the light sources 14 is disposed and the light guiding member is structured so that at least a front surface and an inner peripheral surface of the light guiding member are shone by the lights emitted from a plurality of the light sources 14.

In the embodiment described above, the light source 14 may be a light emitting element other than an LED. Further, in the embodiment described above, the board 15 may be a rigid board. In addition, in the embodiment described above, a card 3 may include no built-in IC chip. Further, no magnetic stripe is formed on a card 3. Further, in the embodiment described above, the card reader 2 may be a card conveyance type card reader having a card conveyance mechanism which is capable of automatically conveying a card 3. In the embodiment described above, a card reader 2 in a state that the light-emitting part 10 is detached may be mounted and used in the host apparatus 4.

Technical Structure

In this embodiment, it is preferable that an optical member is a diffusion member, a light source arrangement recessed part is recessed toward a front side from a rear surface of the diffusion member and is formed in a ring shape so as to surround an inner peripheral surface of the diffusion member, and a plurality of light sources is arranged in a circumferential direction of the light source arrangement recessed part in a state that light emitting sides of the light sources face an inner peripheral side of the diffusion member. According to this structure, the inner peripheral surface of the diffusion member can be shone further brightly and, as a result, the rear side of the cut-out part can be shone further brightly.

In this embodiment, it is preferable that the diffusion member is formed in a rectangular frame shape, the light source arrangement recessed part is formed in a rectangular ring shape, and a light source is disposed in each of a corner part, a long side part and a short side part of the light source arrangement recessed part which is formed in a rectangular ring shape. According to this structure, in addition to the long side part and the short side part of the light source arrangement recessed part formed in a rectangular ring shape, the light source is also disposed in the corner part and thus, unevenness of the brightness of the diffusion member in a circumferential direction of the diffusion member can be suppressed.

In this embodiment, for example, an annular projecting part in a ring shape projecting toward a front side is formed on a front surface of the diffusion member, the annular projecting part is formed along the inner peripheral surface of the diffusion member, and the light source arrangement recessed part is disposed on an outer peripheral side of the diffusion member with respect to the annular projecting part. In this case, a distance between the light source disposed in the light source arrangement recessed part and the cut-out part disposed on an inner peripheral side with respect to the diffusion member can be increased. Therefore, in a case that a card is inserted into the card insertion part, or the card is pulled out from the card insertion part, even when static electricity is generated between a user who operates the card and the card insertion part, the light sources disposed in the light source arrangement recessed part are less affected by the static electricity.

In this embodiment, it is preferable that the flange part and an optical member are formed with through holes for a screw penetrating through in the moving direction of a card, and the flange part and the optical member are fastened and fixed together to a host apparatus on which the card reader is mounted. According to this structure, the optical member is not required to be fixed to the flange part and thus, a structure of the card insertion part can be simplified.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card insertion part for a card reader, the card insertion part being formed with a card insertion slot into which a card is inserted,
   when a side in an inserting direction of the card into the card insertion slot which is one side in a moving direction of the card that is moved in an inside of the card reader is referred to as a rear side, an other side to the side in the inserting direction of the card is referred to as a front side, and a direction perpendicular to a thickness direction of the card inserted into the card insertion slot and perpendicular to the moving direction of the card is referred to as a width direction of the card, the card insertion part comprising:
   a flange part whose thickness direction is the moving direction of the card;
   two protruding parts which are disposed in a separated state from each other in the width direction of the card and are protruded to the front side with respect to the flange part; and
   a light-emitting part which is disposed on the front side with respect to the flange part and is disposed on the rear side with respect to front surfaces of the protruding parts;
   wherein a portion between the two protruding parts in the width direction of the card is a cut-out part which is cut out from a front end of the card insertion part toward the rear side;
   the card insertion slot is formed on an inner side face of the protruding part in the width direction of the card, on a front surface of the protruding part and on a rear surface of the cut-out part;
   the light-emitting part comprises a plurality of light sources and an optical member which is a diffusion member or a light guiding member;
   the optical member is formed with a light source arrangement recessed part in which the plurality of the light sources is disposed;
   the optical member is formed in a frame shape so as to surround the two protruding parts and a rear side portion of the cut-out part together;
   at least a front surface and an inner peripheral surface of the optical member are shone by lights emitted from the plurality of the light sources;
   the front surface of the optical member is disposed on the front side with respect to the rear surface of the cut-out part; and
   a part of the inner peripheral surface of the optical member is exposed between the two protruding parts in the width direction of the card and on both sides in the thickness direction of the card.

2. The card insertion part according to claim 1, wherein the optical member is the diffusion member,
   the light source arrangement recessed part is recessed toward the front side from a rear surface of the diffusion member and is formed in a ring shape so as to surround an inner peripheral surface of the diffusion member, and
   the plurality of the light sources is arranged in a circumferential direction of the light source arrangement recessed part in a state that a light emitting side of the light source faces the inner peripheral side of the diffusion member.

3. The card insertion part according to claim 2, wherein the diffusion member is formed in a rectangular frame shape,
   the light source arrangement recessed part is formed in a rectangular ring shape, and
   the light source is disposed in each of a corner part, a long side part and a short side part of the light source arrangement recessed part which is formed in the rectangular ring shape.

4. The card insertion part according to claim 3, wherein a front surface of the diffusion member is formed with an annular projecting part in a ring shape projecting toward the front side,
   the annular projecting part is formed along the inner peripheral surface of the diffusion member, and
   the light source arrangement recessed part is disposed on an outer peripheral side of the diffusion member with respect to the annular projecting part.

5. A card reader comprising:
   the card insertion part defined as claim 1; and
   a card accommodating part which is disposed on the rear side with respect to the card insertion part and in which a rear side portion of the card inserted from the card insertion slot is accommodated.

6. The card reader according to claim 5, wherein each of the flange part and the optical member is formed with a through hole for a screw penetrating in the moving direction of the card, and
   the flange part and the optical member are fastened and fixed together to a host apparatus on which the card reader is mounted.

* * * * *